United States Patent [19]
Nelle

[11] Patent Number: 4,593,471
[45] Date of Patent: Jun. 10, 1986

[54] ENCAPSULATED MEASURING SYSTEM

[75] Inventor: Guenther Nelle, Bergen, Fed. Rep. of Germany

[73] Assignee: Dr. Johannes Heidenhain GmbH, Traunreut, Fed. Rep. of Germany

[21] Appl. No.: 574,476

[22] Filed: Jan. 27, 1984

[30] Foreign Application Priority Data

Feb. 12, 1983 [DE] Fed. Rep. of Germany ... 8304009[U]

[51] Int. Cl.⁴ ............................................. G01B 11/04
[52] U.S. Cl. ................................. 33/125 T; 33/125 R
[58] Field of Search ............. 33/125 R, 125 C, 125 T, 33/125 A

[56] References Cited

U.S. PATENT DOCUMENTS

| | | | |
|---|---|---|---|
| 3,816,002 | 6/1974 | Wieg | 33/125 T |
| 4,170,828 | 10/1979 | Ernst | 33/125 R |
| 4,295,742 | 10/1981 | Nelle et al. | 33/125 C |

FOREIGN PATENT DOCUMENTS

| | | |
|---|---|---|
| 1176382 | 8/1964 | Fed. Rep. of Germany . |
| 2558625 | 7/1977 | Fed. Rep. of Germany . |
| 2450322 | 5/1978 | Fed. Rep. of Germany . |
| 2830980 | 1/1980 | Fed. Rep. of Germany . |
| 3106701 | 12/1982 | Fed. Rep. of Germany . |

Primary Examiner—Willis Little
Attorney, Agent, or Firm—Willian Brinks Olds Hofer Gilson & Lione, Ltd.

[57] ABSTRACT

An encapsulated measuring system for measuring the relative position of two objects (such as the slide piece and bed of a processing machine) includes a housing which is connected with a first one of the two objects. This housing serves to mount a measuring scale which is scanned by a scanning unit connected to a second one of the two objects. In order to compensate for thermally induced length changes of the first object, the housing serves simultaneously as an expansion element for the scale and as an encapsulating element for the scale and the scanning unit. The housing is fastened at a first fastening point with the first object and at a second, spaced fastening point to the scale. The scale is arranged to be slightly shiftable with respect to the housing in the measuring direction by means of a suitable adhesive. Preferably, the housing provides a greater coefficient of thermal expansion than that of the first object and thermal expansion of the housing between the first and second fastening points serves to compensate for thermal expansion of the first object to which the housing is mounted.

7 Claims, 2 Drawing Figures

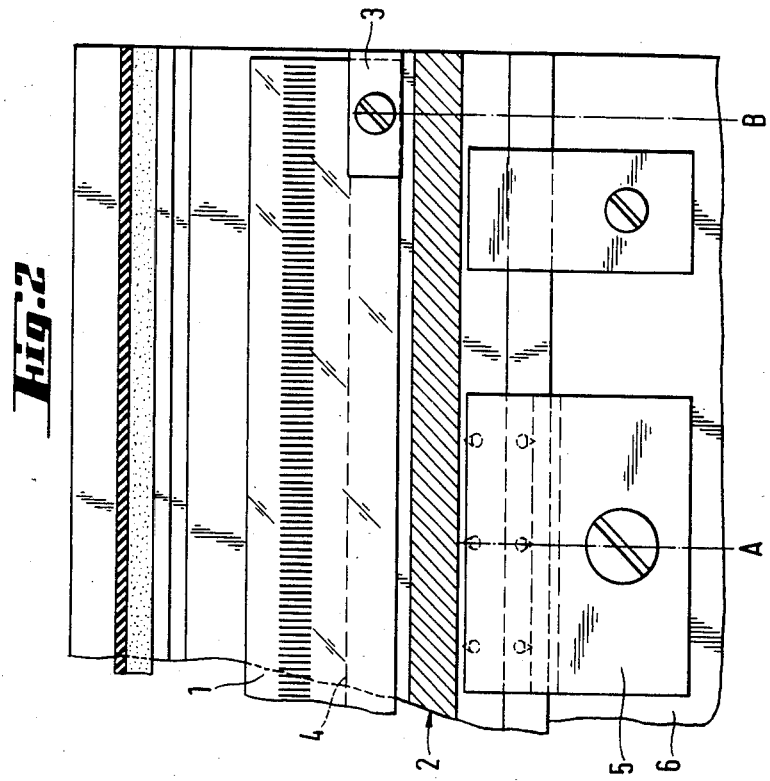
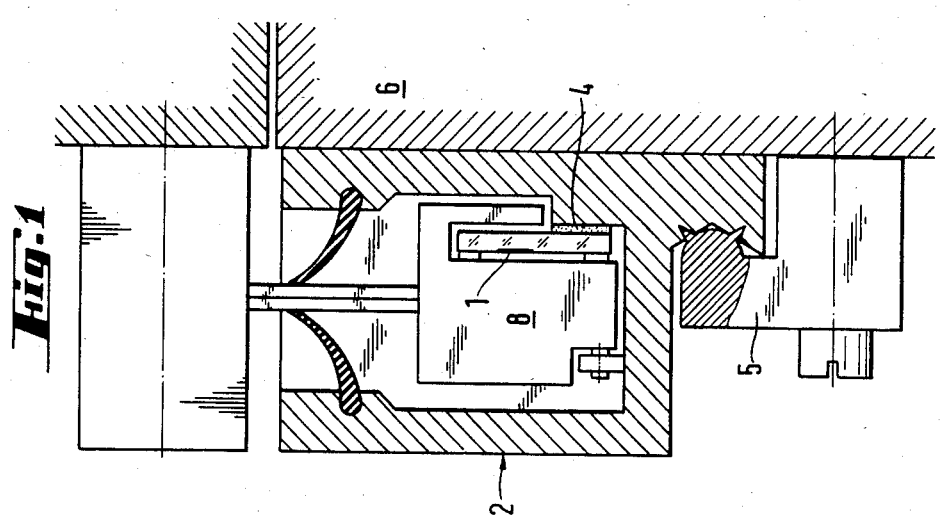

ENCAPSULATED MEASURING SYSTEM

BACKGROUND OF THE INVENTION

The present invention relates to an improvement suitable for use with an encapsulated measuring system for measuring the relative position of two objects, of the type which comprises a housing, a measuring scale disposed within the housing, and a scanning unit mounted to scan the scale.

Such measuring systems are used to measure relative movement, as for example the relative movement between two machine parts. These two machine parts can be formed by the bed and the slide piece of a processing machine, for example. Typically, both the measuring scale and the scanning unit are enclosed within a housing, such as a hollow profile for example, in order to protect sensitive components of the measuring system.

In devices of this class of precision, the selection of the various component materials is of great significance, since materials having differing coefficients of thermal expansion typically must be combined. For a wide variety of reasons, it is only in the rarest of cases that materials of the same or similar coefficients of thermal expansion can be used. In many applications cast iron (which is used for machine parts) must be combined with aluminum (which is used for the hollow profile housing) along with glass or steel for the measuring scale. Furthermore, the work piece to be processed often may be made of steel.

It is a known practice of the prior art to mount the measuring scale to the housing in a manner such that the measuring scale is longitudinally shiftable with respect to the housing. For example, a layer of a highly elastic adhesive can be used to mount the scale to the housing. When this prior art approach is used, dimensional changes of the housing related to thermal expansion or bending have substantially no influence on the measuring scale. See, for example, the disclosure in German Pat. No. 11 76 382.

In addition, it is known from U.S. Pat. No. 3,816,002 to provide a measuring system in which the housing of the measuring system is fastened to the slide piece of a machine tool. The scale is fixed at one end inside the housing, while the other end of the scale is mounted by means of a tensioning device within the housing. This tensioning device serves to compensate by means of a spring for temperature dependent length changes of the housing. When mounted in this way, the scale remains substantially unaffected by temperature-induced length changes of the housing. The length of the scale, however, will change in correspondence with its own coefficient of thermal expansion. Such dimensional changes of the measuring scale can lead to measuring errors. It is typically necessary, therefore, to take into account measurement errors related to temperature variations in using the measuring system of this patent.

In such measuring systems, if the materials which make up the work pieces are changed, error compensation calculations have to be revised. The magnitudes of the differing coefficients of thermal expansion must be re-evaluated with regard to their effect on each new combination of materials.

German DE-OS No. 28 30 980 describes an arrangement for the correction of setting errors which occur in a measuring system as a result of thermally induced dimensional changes of machine parts. According to this disclosure, a first measuring interval (in the form of a drill rod) is firmly clamped in the installation plane of the measuring system on the machine part. Thermally induced length changes of this first measuring interval or drill rod result in a corresponding dimensional change of the processing plane of the tool relative to the installation plane of the measuring system. A parallel second measuring interval is rigidly joined with the first measuring interval, and this second measuring interval is positioned in the processing plane of the tool. The first measuring interval is characterized by a greater coefficient of thermal expansion than the second measuring interval such that if the measuring intervals are of equal length under normal conditions, temperature variations cause length differences between the two measuring intervals. This length difference is applied as a correction value to the measuring system for the detection of the change of position of the processing plane of the tool relative to the installation plane of the measuring system. This measuring arrangement is relatively expensive to implement, and requires that the second measuring interval be fastened to the first measuring interval in the processing plane of the tool. This is not possible in all measuring machines and the utility of this correction arrangement is therefore restricted to certain applications.

German DE-OS No. 25 58 625 discloses a machine tool which includes a scale for the correction of thermally induced spindle displacement. This scale is made up of an arrangement of several bars which are oriented parallel to one another. At least one of these bars is of steel, is fastened at one end to the machine, and is connected at its free end with at least one parallel bar of aluminum. The free end of this aluminum bar is joined in the vicinity of the fastening point with another bar of steel, on the free end of which is arranged a measuring sensor which interacts with a fixed point on the machine housing. This correction arrangement serves to establish a constant measuring interval, the length of which is substantially independent of thermally induced variations. This constant measuring interval is oriented parallel to a machine part, the thermal expansion of which is to be compensated. The measuring values determined by means of this constant measuring interval for the spindle displacement are applied to the drive control of the machine part which includes the spindle.

German Pat. No. 24 50 322 and German Pat. No. 31 06 701 disclose arrangements for the compensation of thermal length changes of machine parts. In these arrangements an expension bar with a greater coefficient of thermal expansion than that of the machine part is fastened with one end to the machine part and the other end to a scale which is mounted to be slidable in the measuring direction with respect to the machine part. The material and the length of the expansion bar are dimensioned in such a way that when the processing plane of the tool is shifted with respect to the scanning plane of the measuring system as a consequence of thermally induced length changes of the machine part, the scale undergoes a like direct displacement of the same amount in order to provide temperature compensation.

SUMMARY OF THE INVENTION

The present invention is directed to an improved encapsulated measuring system of the type described above in which a particularly simple and effective means for eliminating thermally induced changes in the dimension of machine parts is provided.

According to this invention, an encapsulated measuring system for measuring the relative position of two objects, of the type which comprises a housing, a measuring scale disposed within the housing, and a scanning unit mounted to scan the scale and mounted to one of the two objects is provided. According to this invention, first means for securing the housing to the other of the two objects at a first fastening point, as well as second means for securing the scale to the housing at a second fastening point such that the scale is slightly movable with respect to the housing at points spaced from the second fastening point are provided. The separation of the first and second fastening points along a measuring direction defined by the scale are selected such that thermal expansion and contraction of the portion of the housing between the first and second fastening points compensates for and counteracts thermal expansion and contraction of the other of the two objects to which the housing is mounted.

The present invention provides the important advantage that no additional elements are required in order to obtain the desired compensation for thermally induced length changes of machine parts. In the apparatus of this invention the housing serves two distinct functions: in the first place, it acts as an expansion element in order to provide temperature compensation, and in the second place, it acts as an encapsulating element to surround and protect the scale and the scanning unit. The pre-existing encapsulating housing does not have to be substantially altered in construction or dimensions to provide this important expansion compensating function. Thus, the present invention provides a particularly economical measuring system for achieving high measuring precision. Further advantageous features of the invention are set forth in the dependent claims.

The invention itself, together with further objects and attendant advantages, will best be understood by reference to the following detailed description, taken in conjunction with the accompanying drawings.

BRIEF DESCRIPTION OF THE DRAWINGS

FIG. 1 is a cross-sectional view of a length measuring device which includes a presently preferred embodiment of this invention.

FIG. 2 is a partial longitudinal sectional view of one end of the device of FIG. 1 showing the manner in which the housing and the scale are mounted in place.

DETAILED DESCRIPTION OF THE PRESENTLY PREFERRED EMBODIMENTS

Turning now to the drawings, FIG. 1 shows a cross-sectional view of an encapsulated length measuring instrument which incorporates a presently preferred embodiment of this invention. This length measuring instrument includes a measuring scale 1 which is formed of a suitable material such as quartz glass, for example. Preferably, the coefficient of thermal expansion of the scale 1 is virtually zero. For example, a quartz glass such as that commercially marketed under the trade name "Herasil" can be used. The scale 1 is fastened by means of a highly elastic layer of adhesive 4 to the interior of a housing 2. This housing 2 is a rigid, hollow profile which protects the scale 1 from distortion. The housing 2 may, for example, be extruded from aluminum.

In the event of uniform temperature variations over the entire length of the scale 1, this type of fastening of the scale 1 to the housing 2 has the same properties as if the scale 1 were joined solidly with the housing 2 at one point in the middle of the scale 1. The housing 2 can expand uniformly from the middle in the measuring direction so that only negligibly small tensions are applied to the scale 1, which do not substantially alter its length.

The housing 2 serves to enclose a scanning unit 8 which moves along the length of the housing 2, thereby scanning the scale 1. A clamping shoe 5 is used to fasten the housing 2 to one of the machine components 6, the relative position of which is to be measured. The scanning unit 8 is coupled in the conventional way as shown in FIG. 1 with the other of the two machine components, the relative position of which is to be measured.

FIG. 2 shows a longitudinal section of one end of the encapsulated measuring system of FIG. 1. As shown in FIG. 2, the quartz glass scale 1 is firmly clamped at one of its ends to the housing 2 by means of a clamping device 3. At points spaced from the clamping device 3, the quartz glass scale 1 is supported on the housing 2 only by means of the highly elastic adhesive layer 4. Thus, the housing 2 can expand or contract in response to variations in temperature without distorting the scale 1. The housing 2 is solidly anchored by means of the clamping shoe 5 to the associated machine component 6.

In FIG. 2 the reference symbol A is used to denote the fastening point of the housing 2 with respect to the machine component 6, and the reference symbol B is used to denote the fastening point of the scale 1 with respect to the housing 2. By properly selecting the separation between the fastening points A and B, taking into consideration the coefficients of thermal expansion of the housing 2 and the machine component 6, the housing 2 can be made to operate as an expansion component which compensates for thermally induced length changes of the machine component 6. That is, the thermal expansion of the housing 2 between the fastening points A and B compensates for shifts in the position of the fastening point A caused by thermally induced dimensional changes in the machine component 6.

In alternate embodiments, the scale 1 may be made of a nickel-steel alloy which is marketed under the trade names "Invar" or "Vacodil 36". The coefficient of thermal expension of such a scale is so slight that the dimensional changes caused by temperature changes of such a scale can in practice be disregarded.

Of course, the selection of materials to be combined for the scale (Invar or quartz glass) and the housing (aluminum, fiber-reinforced synthetic material, or the like) is controlled by the anticipated conditions of use and justifiable costs of the measuring system.

Of course, it should be understood that a range of changes and modifications to the preferred embodiments described above will be apparent to those skilled in the art. It is therefore intended that the foregoing detailed description be regarded as illustrative rather than limiting, and that it be understood that it is the following claims, including all equivalents, which are intended to define the scope of this invention.

I claim:

1. In an encapsulated measuring arrangement for measuring the relative position of two objects, said measuring arrangement comprising a housing, a measuring scale disposed within the housing, and a scanning unit adapted to scan the scale and mounted to one of the two objects, the improvement comprising:

first means for securing the housing to the other of the two objects at a first fastening point; and second means for securing the scale to the housing at a second fastening point such that the scale is slightly movable in a measuring direction defined by the scale with respect to the housing at points spaced from the second fastening point;

thermal expansion of said other of the two objects operating to shift the first fastening point in a first direction aligned with the measuring direction by a predetermined distance per unit increase in temperature;

the separation of the first and second fastening points along the measuring direction being selected such that thermal expansion of the portion of the housing between the first and second fastening points shifts the second fastening point in a second direction, aligned with the measuring direction and opposed to the first direction, by said predetermined distance per unit increase in temperature;

thermal expansion and contraction of the portion of the housing between the first and second fastening points thereby shifting the position of the scale in the measuring direction with respect to the other of the two objects by an amount selected to compensate for and counteract thermal expansion and contraction of the other of the two objects.

2. The invention of claim 1 wherein the first means comprises a clamping shoe.

3. The invention of claim 1 wherein the housing is formed of aluminum and wherein the coefficient of thermal expansion of the housing is greater than that of the other of the two objects.

4. The invention of claim 1 wherein the second means comprises a highly elastic adhesive layer between the scale and the housing.

5. The invention of claim 1 wherein the coefficient of thermal expansion of the scale is substantially equal to zero.

6. The invention of claim 5 wherein the scale is formed of a nickel steel.

7. The invention of claim 5 wherein the scale is formed of a quartz glass.

* * * * *

UNITED STATES PATENT AND TRADEMARK OFFICE
CERTIFICATE OF CORRECTION

PATENT NO. : 4,593,471
DATED : June 10, 1986
INVENTOR(S) : Guenther Nelle

It is certified that error appears in the above-identified patent and that said Letters Patent is hereby corrected as shown below:

On the title page

<u>IN THE SECTION ENTITLED "ATTORNEY, AGENT, OR FIRM"</u>

Please delete the comma after "Lione".

<u>IN THE BACKGROUND OF THE INVENTION</u>

In column 2, line 50, please delete "expension" and substitute therefor --expansion--.

<u>IN THE DETAILED DESCRIPTION OF THE PRESENTLY PREFERRED EMBODIMENTS</u>

In column 4, line 46, please delete "expension" and substitute therefor --expansion--.

Signed and Sealed this

Twenty-sixth Day of April, 1988

Attest:

DONALD J. QUIGG

*Attesting Officer*     *Commissioner of Patents and Trademarks*